| United States Patent [19] | [11] | 4,040,840 |
|---|---|---|
| Sugiyama et al. | [45] | Aug. 9, 1977 |

[54] PHOTOGRAPHIC SENSITIVE ELEMENTS HAVING DYED LAYERS

[75] Inventors: Masatoshi Sugiyama; Akira Ogawa, both of Minami-ashigara, Japan

[73] Assignee: Fuji Photo Film Co., Ltd., Minami-ashigara, Japan

[21] Appl. No.: 744,353

[22] Filed: Nov. 23, 1976

[30] Foreign Application Priority Data

Nov. 26, 1975   Japan ................... 50-142580

[51] Int. Cl.$^2$ ................................ G03C 1/84
[52] U.S. Cl. ................... 96/84 A; 96/84 R
[58] Field of Search ............... 96/84 R, 84 M, 84 A, 96/84 UV, 140

[56] References Cited

U.S. PATENT DOCUMENTS

| 3,746,547 | 7/1973 | Tsuji et al. ................... 96/84 A |
| 3,756,819 | 9/1973 | Sinclair et al. ................. 96/84 A |
| 3,795,519 | 3/1974 | Miyazako et al. ............... 96/84 A |
| 3,876,429 | 4/1975 | Poppe et al. ................... 96/84 A |
| 3,984,246 | 10/1976 | Ohlschlagar et al. .......... 96/84 R |

*Primary Examiner*—Jack P. Brammer
*Attorney, Agent, or Firm*—Sughrue, Rothwell, Mion, Zinn and Macpeak

[57] ABSTRACT

Silver halide photographic sensitive elements having at least one dye containing hydrophilic colloid layer, in which the hydrophilic colloid layer contains at least one merocyanine dye having an isoxazole nucleus, a pyrazoline-5-one nucleus and at least one acid group in the molecule wherein the 3-position of the isoxazole nucleus is linked through a methine chain to the 4-position of the pyrazoline-5-one nucleus and a basic polymer is included in at least one of the hydrophilic colloid layers.

12 Claims, No Drawings

PHOTOGRAPHIC SENSITIVE ELEMENTS HAVING DYED LAYERS

BACKGROUND OF THE INVENTION

1. Field of the Invention

The present invention relates to silver halide photographic sensitive elements having dyed hydrophilic colloid layers.

2. Description of the Prior Art

In silver halide photographic sensitive elements, dyeing the photographic emulsion layers or other hydrophilic colloid layers so as to absorb light of a specific wavelength range has often been done.

When it is necessary to control the spectral composition of the light passing into the photographic emulsion layers, a dyed layer is generally provided at a position farther from the support than from the photographic emulsion layer. Such a dyed layer is called a filter layer. Where a plurality of photographic emulsion layers are present, the filter layer may be positioned between two of the layers.

Provision of a dyed layer, called an antihalation layer, between the photographic emulsion layer and the support or on the back of the support has been employed in order to inhibit blurring of images, that is, halation, caused by the phenomenon where rays scattered after or during passing through the photographic emulsion layer are reflected at an interface between the emulsion layer and the support or at the surface of the support opposite to that upon which the emulsion layer is coated back into the photographic emulsion layer again. In cases where a plurality of photographic emulsion layers are present, the antihalation layer may be positioned between two of the layers.

In order to prevent degradation of image sharpness caused by scattering of light in the photographic emulsion layers (this phenomenon is generally called irradiation), dyeing of the photographic emulsion layers has been employed.

Usually water soluble dyes are added to those hydrophilic colloid layers which are to be dyed. These dyes must have the following characteristics.

1. The dyes must have an appropriate spectral absorption corresponding to their use.
2. The dyes must be photochemically inert. Namely, they must not have an adverse chemical influence upon the silver halide photographic emulsion layers, for example, decrease the sensitivity, degrade the latent images or cause an occurrence of fog, etc.
3. The dyes must be decolored during photographic processings or must be removed by dissolving into processing solutions or in water used for washing and must not cause a harmful residual color on the photographic sensitive elements after processing.

Many attempts have been made by persons skilled in the art in order to find dyes which satisfy these requirements. There are, for example, oxonol dyes having a pyrazolone nucleus such as the dyes described in British Patent 506,385, oxonol dyes having a barbituric acid nucleus such as the dyes described in U.S. Pat. No. 3,247,127, other oxonol dyes as described in U.S. Pat. Nos. 2,533,472 and 3,379,533 and British Patent 1,278,621, hemioxonol dyes such as the dyes described in British Patent 584,609, styryl dyes such as the dyes described in U.S. Pat. No. 2,298,733, merocyanine dyes such as the dyes described in U.S. Pat. No. 2,493,747 and cyanine dyes such as the dyes described in U.S. Pat. No. 2,843,486.

Many of the dyes which are to be decolored in the processing of the photographic emulsion layers are decolored by sulfites (or bisulfites) present in a development processing sulution or by such salts under alkaline conditions, which have been described in, for example, British Pat. 506,385.

Where the dyes layer is a filter layer or is an antihalation layer positioned on the same side of the support as the photographic emulsion layers, it is often necessary for that layer only to be dyed selectively and other layers not to be substantially dyes. If this is not so, the dyed layer not only causes a harmful spectral effect on other layers but also its effect as the filter layer or the antihalation layer is deteriorated.

There are many methods to dye selectively a specific hydrophilic colloid layer. However, the most commonly used method comprises incorporating a hydrophilic polymer having an opposite electric charge to the dye ion as a mordant in the hydrophilic colloid layer, by which the dye is present only in that specific layer due to an interaction between the mordant and the dye molecule (which is based mainly on absorption by means of electric charges but also on hydrophobic bonds). Polymers derived from ethylenically unsaturated compounds having a dialkylaminoalkyl ester residue described in British Patent 685,475, reaction products prepared by reacting polyvinyl alkyl ketone with aminoguanidine as described in British Patent 850,281, and polymers derived from 2-methyl-1-vinylamidazole as described in U.S. Pat. No. 3,445,231 are known as mordants. Where a method of mordanting using such polymers is used, when the layer to which the dye was added is brought into contact with other hydrophilic colloid layers in a wet state, a portion of the dye sometimes diffuses from the former layer to the latter layer. The diffusion of the dye depends upon not only the chemical structure of the mordant but also on the chemical structure of the dye used.

Where the above described high molecular weight mordants are used, residual color on the photosensitive elements easily occurs after photographic processings, and, particularly, after processing in which a shortened processing time is used. The reason for this is believed to be because the dye or reversible decolored products remain in the mordant containing layer, because the mordant still has a certain degree of bonding strength to the dye although the bonding strength of the mordant to the dye becomes fairly weak in alkaline solutions such as a developing solution. This also depends upon the chemical structure of the mordant and that of the dye.

SUMMARY OF THE INVENTION

It has now been found that merocyanine dyes having an isoxazole nucleus as a basic nucleus and a pyrazoline-5-one nucleus as an acid nucleus in various water soluble dyes used for dyeing hydrophilic colloid layers of photographic sensitive elements are irreversibly decolored in sulfite-containing developing solutions and do not adversely influence the photographic properties of the photographic emulsions, and further that they are sufficiently mordanted by basic polymers and do not diffuse from the basic polymer containing layer into other layers. It has also be found that these merocyanine dyes have a high water solubility and an excellent compatibility in hydrophilic colloid layers.

Accordingly, a first object of the present invention is to provide photographic sensitive elements having a hydrophilic colloid layer which contains a water soluble dye which is irreversibly decolored in photographic processing and which does not adversely influence the photographic properties of photographic emulsions.

A second object of the present invention is to provide silver halie photographic saensitive elements wherein only the basic polymer containing hydrophilic colloid layer is selectively dyed sufficiently.

A third object of the present invention is to provide photographic sensitive elements having a hydrophilic colloid layer which contains a dye which does not result in a residual color remaining after the photographic processing even if the basic polymer is included in any one of the hydrophilic colloid layers.

These object of the present invention have been attained with silver halide light-sensitive elements wherein a basic polymer is incorporated in at least one hydrophilic colloid layer and at least one merocyanine dye containing an isoxazole nucleus, a pyrazoline-5-one nucleus and at least one acid group in the molecule, wherein the 3-position of the isoxazole nucleus is linked through a methine chain to the 4-position of the pyrazoline-5-one nucleus is incorporated in at least one hydrophilic colloid layer.

DETAILED DESCRIPTION OF THE INVENTION

The dyes used in the present invention are represented more specifically by the following formula (I):

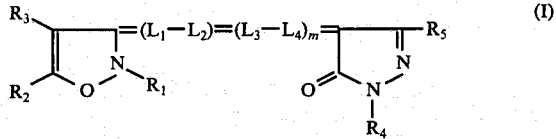

In the formula (I), $R_2$ and $R_3$, which may be the same or different, each represents a hydrogen atom, an alkyl group having 1 to 8 carbon atoms (for example, a methyl group, an ethyl group, a tert-amyl group or an n-hexyl group) or an unsubstituted or substituted phenyl group (for example, having one or more substitutents such as an alkyl group having 1 to 4 carbon atoms, an akoxy group having 1 to 4 carbon atoms, a halogen atom or a sulfo group, etc., for example, a p-tolyl group, a p-methoxyphenyl group, a p-chlorophenyl group or a p-sulfophenyl group).

Examples of preferred isoxazole nuclei in the formula (I) include isoxazole, 5-methylisoxazole, 5-ethylisoxazole, 5-phenylisoxazole, 4,5-dimethylisoxazole, 4-phenylisoxazole, 4-methylisoxazole, 4-methyl-5-phenylisoxazole and 4-p-tolylisoxazole nuclei.

$R_1$ represents an aliphatic group having 1 to 20 carbon atoms, which may be straight chain, branched chain or a ring including an unsubstituted alkyl group (for example, a methyl group, an ethyl group, an n-propyl group, an isopropyl group, an n-octyl group, an n-decyl group, a cyclohexyl group or a 2-cyclohexylethyl group, etc.) or a substituted alkyl group having one or more substituents [for example, a halogen atom (e.g., a fluorine atom, a chlorine atom or a bromine atom, etc.), a cyano group, a carboxy group, a sulfo group, a sulfoalkoxy group having 1 to 10 carbon atoms (for example, a sulfopropoxy group), a sulfoalkoxyalkoxy group (for example, a sulfopropoxyethoxy group), a phospho group, an alkoxycarbonyl group having 2 to 10 carbon atoms (for example, an ethoxycarbonyl group, a butoxycarbonyl group or a benyloxycarbonyl group), a carbamoyl group, a substituted carbamoyl group having 2 to 10 carbon atoms (for example, a methylcarbamoyl group, an ethylcarbamoyl group, a phenylcarbamoyl group, a benzylcarbamoyl group, a diethylcarbamoyl group, a morpholinocarbamoyl group or a piperazinocarbamoyl group, etc.) an acyl group having an alkyl moiety of 1 to 10 carbon atoms, (for example, an acetyl group, a propionyl group, a pivaloyl group, a benzoyl group, a phenacyl group, a methylsulfonyl group, a benzenesulfonly group or a tosyl group, etc.), an acyloxy group having an alkyl moiety or aryl moiety of up to 10 carbon atoms (for example, an acetoxy group or a benzoyloxy groups, etc.), a hydroxy group, an alkoxy group having 1 to 10 carbon atoms (for example, a methoxy group, an ethoxy group or a butoxy group, etc.), an amino group (which may be substituted with substituents having 1 to 16 carbon atoms, for example, an amino group, a methylamino group, an ethylamino group, a benzylamino group, a morpholino group, an N-pyrrolidyl group, a dimethylamino group, an anilino group, an acetylamino group, a benzoylamino group or a methylsulfonylamino group, an aryl group which may be a monocyclic ring or a bicyclic condensed ring (for example, a phenyl group, a naphthyl group, a p-carboxyphenyl group or a p-sulfoalkoxyphenyl group), an aryloxy group (for example, a phenoxy group), an aryloxycarbonyl group (for example, a phenoxycarbonyl group) or an alkenyl group having 2 to 18 carbon atoms (for example, a vinyl group or a propenyl group), etc.]. Further, other substituents which are conventionally used as substituents on ring nitrogen atoms of cyanine dyes and merocyanine dyes can be employed as well.

It is however, preferred that the substituent represented by $R_1$ contains at least one of a carboxy group, a sulfo group or a phospho group.

$R_4$ represents a substituent which preferably has at least one sulfo group or carboxy group, such as a sulfoalkyl group having 1 to 8 carbon atoms (for example, a 2-sulfoethyl group, a 3-sulfopropyl group, a 3-sulfobutyl group or 4-sulfobutyl group), a sulfoalkoxyalkyl group having a total of a 2 to 8 carbon atoms (for example, a 2-(2-sulfoethoxy)ethyl group), a sulfoalkoxyalkyl group having a total of 3 to 8 carbon atoms (for example, a 2-[2-(2-sulfoethoxy)ethoxy]ethyl group), a mono- or bicyclic sulfoaryl group (for example, a p-sulfophenyl group, an m-sulfophenyl group, a 3,5-disulfophenyl group or a 6,8-disulfo-2-naphthyl group), a sulfoaralkyl group having a total of 7 to 9 carbon atoms (for example, a p-sulfobenzyl group or an m-sulfo-phenethyl group, a sulfoaryloxyalkyl group (for example, a 2-(m-sulfophenoxy)ethyl group), a carboxyalkyl group having an alkyl moiety of 1 to 8 carbon atoms (for example, a carboxymethyl group or a 3 -carboxypropyl group) or a mono- or bicyclic carboxaryl group (for example, a p-carboxyphenyl group or an m-carboxyphenyl group). The alkyl groups and aryl groups in these substituents may have one or more additional substituents, such as a halogen atom or a hydroxy group, etc., (for example, a 2-hydroxy-3-sulfopropyl group).

$R_4$ also represents an alkyl group having a total of 1 to 18 carbon atoms in addition to the above-described groups, namely, an unsubstituted alkyl group (for example, a methyl group, an ethyl group, a butyl group, an octyl group or a cyclohexyl group) or a substituted alkyl group [for example, a substituted alkyl group having one or more substituents, such as a hydroxy group, a cyano group, a halogen atom (for example, a chlorine atom or a bromine atom), a monocyclic or bicyclic aryl group (for example, a phenyl group, a p-tolyl group or a 2,5-dichlorophenyl group) or an alkenyl group having 2 to 8 carbon atoms (for example, a vinyl group), etc.], or a monocyclic or bicyclic aryl group, namely, an unsubstituted aryl group (for example, a phenyl group or a naphthyl group) or a substituted aryl group (for example, an aryl group having one or more substiuents, such as an alkyl group of 1 to 8 carbon atoms, an alkoxy group having 1 to 4 carbon atoms, a halogen atom, an alkoxycarbonyl group having 2 to 8 carbon atoms or a monocyclic or bicyclic aryloxy group (for example, a phenoxy group)). Examples of these substituted aryl groups include a p-tolyl group, a p-methoxyphenyl group, an o-methoxyphenyl group, a 2,5-dichlorophenyl group, a 2,4,6-trichlorophenyl group, a p-ethoxycarbonylphenyl group and a 4-(p-sulfophenoxy)phenyl group, etc.

Where $R_4$ neither has a sulfo group nor a carboxy group, it is preferred that $R_5$ represents a carboxy group or a substituent having at least one of a sulfo group or a carboxy group, such as a sulfoaryl group (for example, a p-sulfophenyl group, an m-sulfophenyl group, a 3,5-disulfophenyl group or 6,8-disulfo-2-napthyl group, etc.), a sulfoalkylcarbonylaminophenyl group wherein the alkyl moiety has 1 to 6 carbon atoms (for example, a p-sulfopropionylaminophenyl group), a sulfoanilino group (for example, a p-sulfoanilino group or m-sulfoanilino group, etc.), a carboxyaryl group (for example, a p-carboxyphenyl group or an m-carboxyphenyl group, etc.), a carboxyanilino group (for example, an m-carboxyanilino group, or a 2,4-dicarboxylanilino group, etc.), a sulfobenzoylamino group (for example, a p-sulfobenzoylaminolcarbamoyl group (for example, a p-sulfophenylacarbamoyl group), a sulfoalkylcarbamoyl group or an m-sulfobenzoylamino group; etc.), a sulfoarylcarbamoyl group (for example, p-sulfophenylcarbamoyl group), a sulfoalkylkylcarbamoyl group (for example, a 3-sulfopropylcarbamoyl group) or a carboxyanilinophenyl group (for example, a 4-(p-carboxyanilino)-phenyl group, etc.).

In this case, one or more of the phenyl groups in the above-described substituents can be further substituted with one or more substituents, such as an alkyl group (having 1 to 4 carbon atoms) (for example, a methyl group or an ethyl group, etc.), a halogen atom (for example, a chlorine atom) or an alkoxy group having 1 to 8 carbon atoms (for example, a methoxy group or an ethoxy group, etc.).

In addition, $R_5$ represents an alkyl group having 1 to 18 carbon atoms which may be substituted, (for example, a methyl group, an ethyl group, a t-butyl group, an octyl group or a β-chloroethyl group), a hydroxy group, an alkoxy group having 1 to 8 carbon atoms (for example, a methoxy group, an ethoxy group or a β-chloroethoxy group), an amino group, namely, an unsubstituted amino group or a substituted amino group (for example, an alkylamino group having 1 to 14 carbon atoms (such as a dimethylamino group or an ethylamino group, etc.), an acylamino group having up to 14 carbon atoms (for example, an acetylamino group, a pivaloylamino group, a benzoylamino group or a benzenesulfonylamino group, etc.), an arylamino group (for example, an anilino group or an α-naphthylamino group), a substituted anilino group (for example, a p-methylanilino group, a p-chloroanilino group or a p-methoxyanilino group, etc.), an aralkylamino group having 7 to 14 carbon atoms (for example, a benzylamino group or a phenethylamino group, etc.), a ureido group, a substituted ureido group, such as a ureido group substituted with an alkyl group having 1 to 8 carbon atoms (for example, a methyl group, an ethyl group or an n-propyl group, etc.) or an aryl group (for example, a phenyl group or a p-tolyl group, etc.), a cyclic amino group (e.g., a morpholino group, a pyrrolidino group or a piperidino group, etc.), etc.), an alkoxycarbonyl group having an alkoxy moiety of 1 to 14 carbon atoms which may be substituted (for example, an ethoxycarbonyl group or a benzyloxycarbonyl group, etc.), a carbamoyl group, namely, an unsubstituted carbamoyl group or a substituted carbamoyl group (for example, an alkylcarbamoyl group having an alkyl moiety of 1 to 4 carbon atoms (for example, an ethylcarbamoyl group), or a monocyclic or bicyclic arylcarbamoyl group (for example, a phenylcarbamoyl group or a p-sulfophenylcarbamoyl group, etc.), etc.), a monocyclic or bicyclic aryloxycarbonyl group which may be substituted (for example, a phenoxycarbonyl group or a tert-butylphenoxycarbonyl group, etc.), or a mono- or bicyclic aryl group, namely, an unsubstituted aryl group (for example, a phenyl group or a naphthyl group, etc.) or a substituted aryl group (for example, a monocyclic or bicyclic aryl group having one or more substituents, such as an alkyl group of 1 to 8 carbon atoms, an alkoxy group of 1 to 4 carbon atoms or a halogen atom, etc.).

$L_1$, $L_2$, $L_3$ and $L_4$ each represents a methine group or a substituted methine group having an alkyl group of 1 to 4 carbon atoms or a phenyl group.

$m$ represents 0 or 1.

In the formula (I), at least one of $R_1$, $R_4$ and $R_5$ contains an acid group (a sulfo group or a carboxy group).

Preferred days used in the present invention are dyes represented by the formula (II):

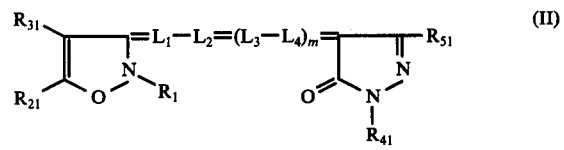

In the formula (II), $L_1$, $L_2$, $L_3$, $L_4$ and $m$ each has the same meaning as in the formula (I). $R_{21}$ and $R_{31}$, which may be the same or different, each represents a hydrogen atom, a lower alkyl group of 1 to 4 carbon atoms (for example, a methyl group, an ethyl group, an n-propyl group or an n-butyl group, etc.) or a phenyl group.

$R_{41}$ represents a sulfoalkyl group having 1 to 8 carbon atoms (For example, a 2-sulfoethyl group or a 3-sulfopropyl group), a carboxyalkyl group wherein the alkyl moiety has 1 to 8 carbon atoms (for example, a 2-carboxyethyl group), a sulfoaryl group (for example, a p-sulfophenyl group, a 2-chloro-5-sulfophenyl group, a 2,4-disulfophenyl group or a 3-sulfonaphthyl group), a carboxyaryl group (for example, a p-carboxyphenyl group), a sulfoaralkyl group (for example, a p-sulfobenzyl group) or a carboxyaralkyl group (for example, a p-carboxybenzyl group).

$R_{51}$ represents an alkyl group having 1 to 8 carbon atoms (for example, a methyl group, an ethyl group or an n-octyl group, etc.), a hydroxy group, an alkoxy group having 1 to 8 carbon atoms (for example, a methoxy group or an ethoxy group, etc.), a carboxy group, an amino group, an alkylamino group having 1 to 8 carbon atoms (for example, a methylamino group, an ethylamino group or a dimethylamino group), an acylamino group having up to 8 carbon atoms (for example, an acetylamino group, a pivaloylamino group, a benzoylamino group, or a benzenesulfonylamino group, etc.), a ureido group, an alkylureido group wherein the alkyl moiety has 1 to 4 carbon atoms (for example, a methylureido group or an ethylureido group), a phenylureido group (which may be substituted), an arylamino group (for example, an anilino group), an alkoxycarbonyl group having 2 to 9 carbon atoms (for example, a methoxycarbonyl group or an ethoxycarbonyl group), an alkylcarbamoyl group having 2 to 9 carbon atoms (for example, a methylcarbamoyl group or an ethylcarbamoyl group), a phenylcarbamoyl group (which may be substituted), a carbamoyl group or an aryl group, namely, an unsubstituted or substituted aryl group [for example, a phenyl group or a substituted phenyl group having one or more substituents, such as an alkyl group of 1 to 4 carbon atoms, an alkoxy group of 1 to 4 carbon atoms or a halogen atom (for example, a chlorine atom)].

Particularly preferred dyes used in the present invention are dyes represented by the formula (III):

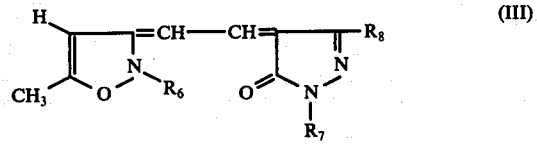

In the formula (III), $R_6$ represents a sulfoalkyl group having 1 to 4 carbon atoms (for example, a 2-sulfoethyl group, a 3-sulfopropyl group or a 4-sulfobutyl group, etc.) or a carboxyalkyl group having 1 to 4 carbon atoms (for example, a carboxymethyl group, a 2-carboxyethyl group or a 3-carboxypropyl group, etc.).

$R_7$ represents a sulfoalkyl group having 1 to 4 carbon atoms (for example, a 3-sulfopropyl group or a 4-sulfobutyl group, etc.), a sulfophenyl group (for example, a p-sulfophenyl group, an m-sulfophenyl group or a 2,4-disulfophenyl group, etc.) or a carboxyphenyl group (for example, a p-carboxyphenyl group or an m-carboxyphenyl group, etc.).

$R_8$ represents a lower alkyl group having 1 to 4 carbon atoms (for example, a methyl group, an ethyl group or a tert-butyl group, etc.), a hydroxy group, an alkoxy group having 1 to 4 carbon atoms (for example, a methoxy group or an ethoxy group, etc.), an amino group (which may be substituted, for example, an unsubstituted amino group, a dimethylamino group, an ethylamino group, an acetylamino group, a benzoylamino group, an m-sulfobenzoylamino group, an anilino group, a methylureido group or a phenylureido group, etc.), an alkylcarbamoyl group having 2 to 5 carbon atoms, a phenylcarbamoyl group (which may be substituted), an alkoxycarbonyl group having an alkoxy moiety of 1 to 4 carbon atoms (for example, a methoxycarbonyl group or an ethoxycarbonyl group, etc.), a carboxy group or a phenyl group (which may be substituted, for example, an unsubstituted phenyl group, a p-tolyl group, a p-chlorophenyl group or a p-methoxyphenyl group).

Examples of the merocyanine dyes which can be used in the present invention are described below (wherein figures are the absorption maximum wavelength of the dye solution in methanol). However, the scope of the present invention is not to be construed as being limited to these dyes.

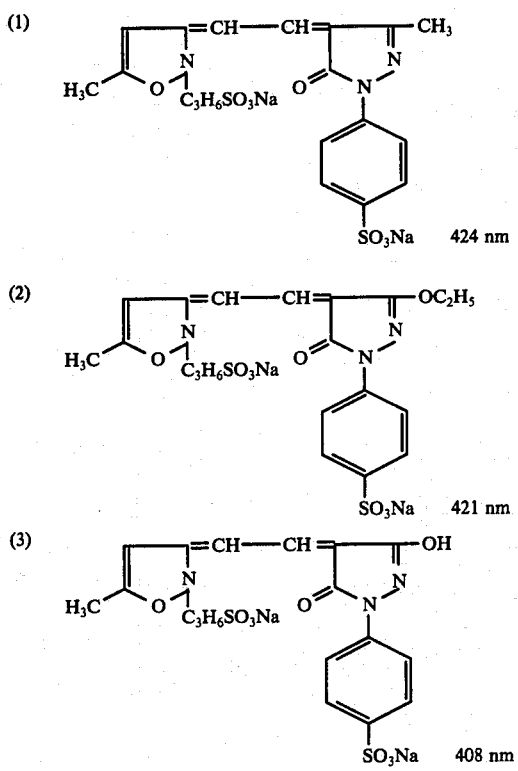

-continued
(4) 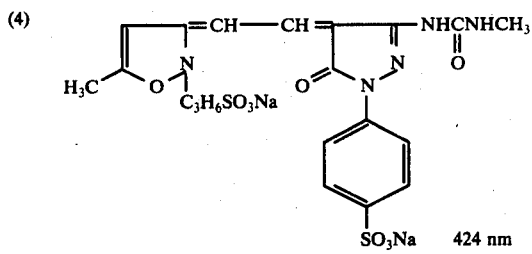
424 nm
(5) 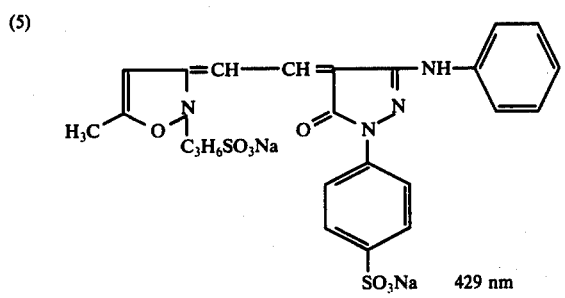
429 nm
(6) 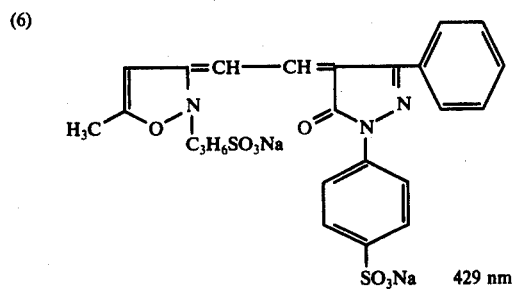
429 nm
(7) 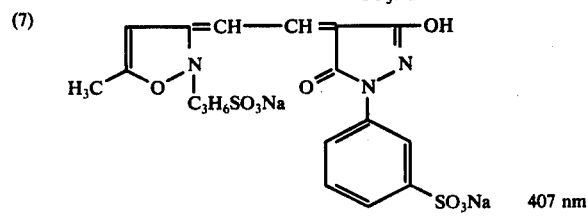
407 nm
(8) 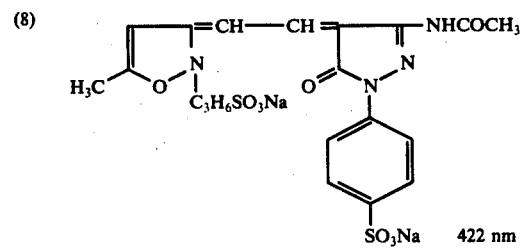
422 nm
(9) 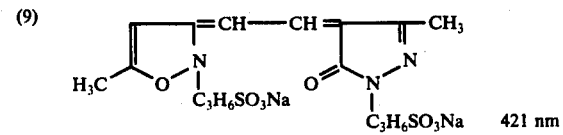
421 nm
(10) 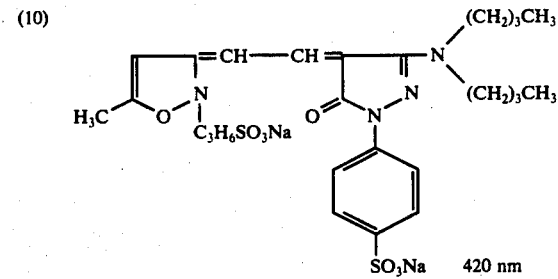
420 nm -continued
(11) 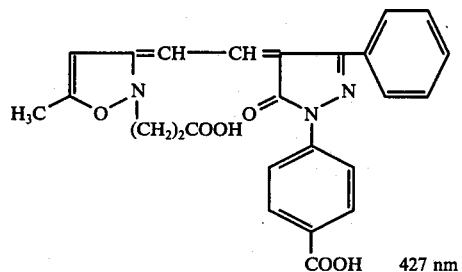
427 nm
(12) 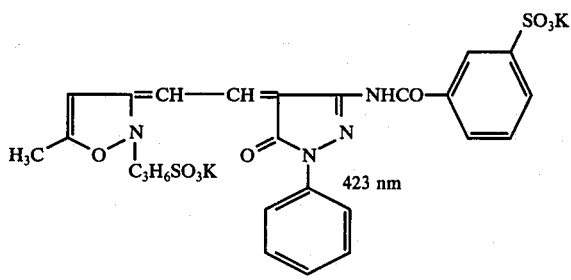
423 nm
(13) 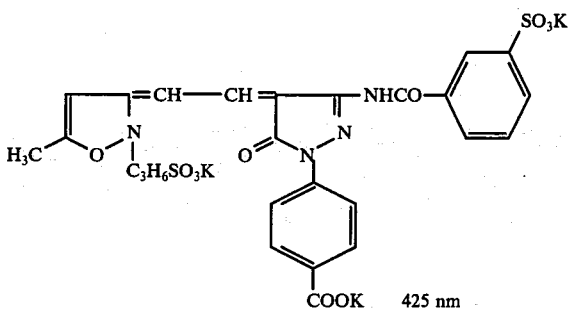
425 nm
(14) 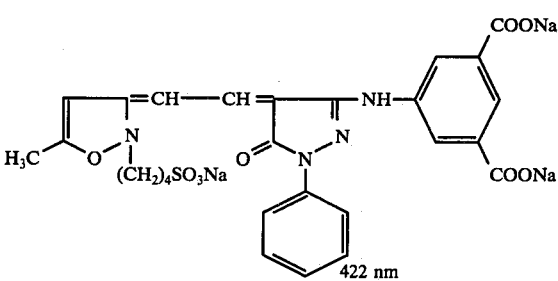
422 nm
(15) 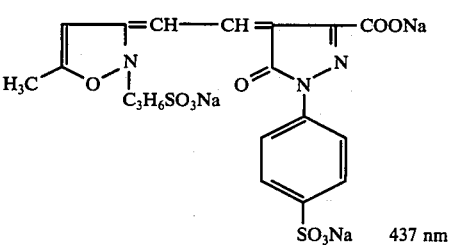
437 nm
(16) 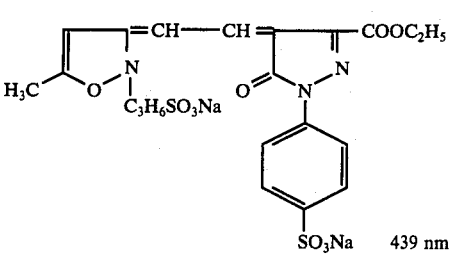
439 nm

(17) 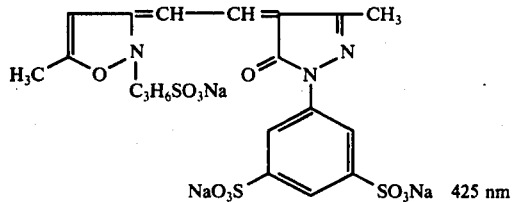 425 nm
(18) 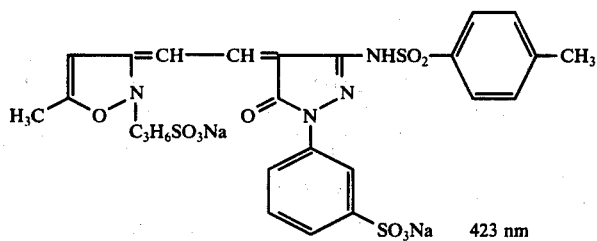 423 nm
(19) 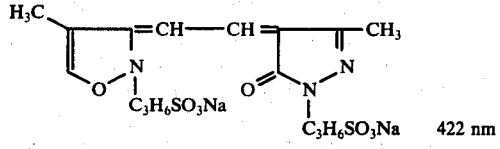 422 nm
(20) 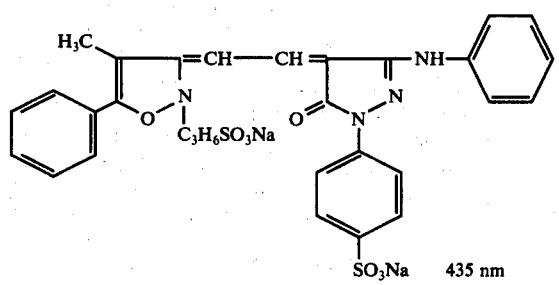 435 nm
(21) 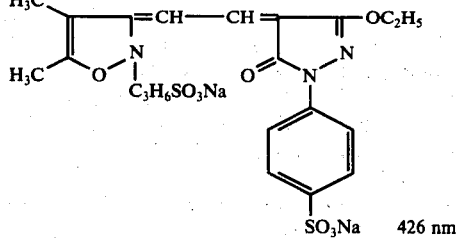 426 nm
(22) 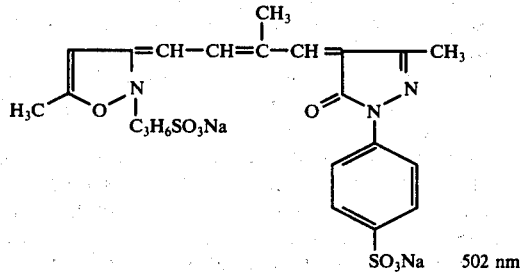 502 nm
(23) 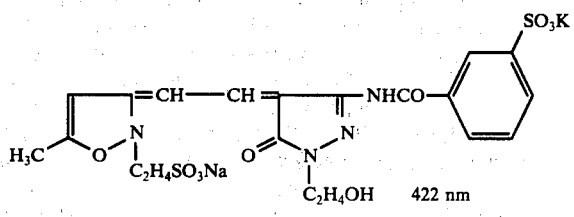 422 nm -continued

(24) 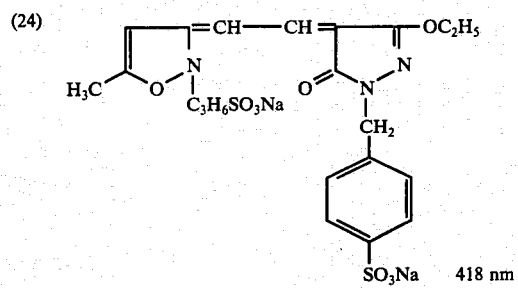

418 nm

The merocyanine dyes used in the present invention can be easily synthesized by the persons skilled in the art using similar processes as used in producing conventional merocyanine dyes. Further, intermediates of the merocyanine dyes can be easily synthesized in the same manner as in synthesizing intermediates for conventional merocyanine dyes.

For example, the merocyanine dyes used in the present invention can be easily synthesized by reacting suitable intermediate compounds, such as anilinomethylene compounds or acetanilidomethylene compounds with pyrazolin-5-one compounds using a suitable basic condensing agent (such as pyridine, piperidine or triethylamine, etc.) with reference to the disclosure of U.S. Pat. Nos. 3,071,467, 2,493,747, 2,493,748, 2,497,876, 3,440,052, 3,440,051, 3,455,684, 3,379,533, 3,282,699, 3,480,439, 3,384,486, 3,364,026, 3,288,610, 2,743,273, 2,856,404, 2,882,159 and 2,778,822.

Isoxazole nuclei present in the dyes of the present invention (i.e., 4- or/and 5-substituted-2-methyl isoxazole nuclei) can be synthesized from commercially available starting materials (e.g., 3,5-dimethyl isoxazole) or in a similar manner to that disclosed in *Chim. Ind.*, 47 (5), pages 516 – 517; *Ber.*, 44, 1161 – 9, 59B 144 – 153, 58B 1473 – 1482 and 67B 1062 – 1077; *J. Indian. Chem. Soc.*, 8, 119 – 128 (1931).

Further, a compound of the formula

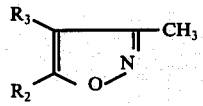

can be synthesized in the same manner as described in the above-described literature, and merocyanine dyes containing this nucleus can be synethesized in a similar manner to that disclosed hereinafter or by reference to the patents descibed above.

Examples of the synthesis of the dyes used in the present invention and intermediates thereof are described below. Unless otherwise indicated herein, all parts, percents, ratios and the like are by weight.

SYNTHESIS EXAMPLE 1

Synthesis of Anhydro-3-(2-anilinovinyl)-5-methyl-2-(3-sulfopropyl)isoxazolium Hydroxide 50 g of 3,5-dimethylisoxazole and 75 g of propanesultone were heated to 100° C on an oil bath for 2 hours with stirring for reaction. 90 g of diphenylformamidine was then added to the reaction mixture and the mixture was heated to 120° C for 1 hour for reaction. After the mixture was allowed to stand to cool, 200 ml of ethanol was added with stirring. The precipitated light yellow crystals were separated by filtration. Yield: 94 g. Melting point: 243° – 245° C (decomposition).

SYNTHESIS EXAMPLE 2

Synthesis of Dye (1)

10 g of anhydro-3-(2-anilinovinyl)-5-methyl-2-(3-sulfopropyl)isoxazolium hydroxide produced as described in Synthesis Example 1 and 7.9 g of 3-methyl-1-(p-sulfophenyl)pyrazoline-5-one were added to 100 ml of ethyl alcohol. 12 ml of acetic anhydride was then added to the mixture with stirring. Further, 21 ml of triethylamine was added dropwise thereto and the mixture was heated on a steam bath for 20 minutes for reaction. After the reaction, about a half of the ethyl alcohol was removed by filtration and the reaction solution was filtered. To the filtrate, a solution of 9 g of potassium acetate in 50 ml of methyl alcohol was added dropwise with stirring at room temperature (about 15° – 30° C) and the precipitated crystals were separated by filtration. The separated crystals were added to 300 ml of ethyl alcohol and washed for 30 minutes at reflux to obtain 10.5 g of the dye. Melting point: about 300° C.

SYNTHESIS EXAMPLE 3

Synthesis of Dye (4)

Dye (4) was synthesized according to Synthesis Example 2. Namely, 12 g of 1-(p-sulfophenyl)-3-(3-methylureido)-pyrazoline-5-one triethylamine salt was used instead of 3-methyl-1-(p-sulfophenyl)pyrazoline-5-one 7.9 g. The reaction was carried out under the same conditions to produce 12.1 g of Dye (4). Melting point: above 300° C.

The dyes can be incorporated into the hydrophilic colloid layers of photographic sensitive elements using conventional methods. Namely, an aqueous solution of the dyes having a suitable concentration (e.g., as described below) is added to an aqueous solution of a hydrophilic colloid. The solution is then applied onto a support or onto another layer of the photographic sensitive element in a known manner.

The amount of the dyes added to the aqueous solution of the hydrophilic colloid is suitably selected within the range of solubility of the dyes. In general, an about 0.5 to about 3% by weight aqueous solution of the dyes so as to provide about 8 to about 800 mg of the dyes per m² of the photographic sensitive element is employed.

It is advantageous to add the dye to a coating solution for preparing a basic polymer containing hydrophilic colloid layer. However, the dyes can be added to a coating solution for preparing another non-light-sensitive hydrophilic colloid layer. In the latter case, the dyes are preferably added to a layer which is nearer the basis polymer containing layer and, more preferably, added to an adjacent layer. Even though the dyes are added to a layer which does not contain the basic polymer, the dyes diffuse into the basic polymer containing layer and are concentrated therein by mordanting. Thus, the basic polymer containing layer is selectively dyed in the finished light-sensitive element. The dyes can slso be added to two or more layers, if desired.

The basic polymer containing hydrophilic colloid layer can be a single layer or can be two or more layers. Such a layer (or layers) can be positioned above the photographic emulsion layer (i.e., farther from the support and closer to incident light of exposure), between two layers when a plurality of photographic emulsion layers is present or between the support and the photographic emulsion layer. The layer selectively dyed due to the presence of the basic polymer can function as a filter layer or an antihalation layer or as another layer, depending on the position of the layer.

In the light-sensitive elements of the present invention, the basic polymer is present in at least one hydrophilic colloid layer. Useful basic polymers include, for example, high molecular weight materials which have tertiary or quaternary nitrogen containing basic residues (for example, dialkylaminoalkyl groups, trialkylammonioalkyl groups, cyclic amino groups, pyridinium groups, N,N-dialkyl-N-benzylammonio groups, piperadine groups, etc.) on the main or the side chains, which are basic hydrophilic high molecular weight materials conventionally used for mordanting acid dyes in the hydrophilic colloid layers of silver halide photographic light-sensitive elements (a suitable degree of polymerization is about 1,000 to about 1,000,000, preferably 5,000 to 1,000,000 and more preferably 10,000 to 200,000).

Typical examples of such polymers include polymers prepared by polymerizing an ethylenically unsaturated compound having a dialkylaminoalkyl ester residue as described in U.S. Pat. No. 2,675,316; copolymers of the above-described ethylenically unsaturated compound and acrylamide as described in U.S. Pat. No. 2,839,401; basic polymers synthesized from maleinimide (including maleinimide derivatives) and copolymers of such maleinimide derivatives and styrene as described in U.S. Pat. Nos. 3,016,306 and 3,488,706; polymers prepared by reacting polyvinylalkylketone (for example, polyvinylmethylketone) or aldehydes (for example, polyacrolein) with aminoguanidine as described in U.S. Pat. No. 2,882,156; polymers having 2-methylimidazole nuclei in the side chains as described in U.S. Pat. No. 3,445,231; addition polymers prepared from bisacrylamide and secondary amines and quaternary salts of these polymers as described in U.S. Pat. No. 3,795,519; 3- or 4-component copolymers including polyvinylpyridine or polyvinylquinoline as described in British Patent 765,520 and U.S. Pat. No. 2,721,852 and polymers described in U.S. Pat. No. 3,624,229 and German Patent Application (OLS) 1,914,362. A standard amount of the basic mordant polymer which is used is about 1 to about 5 equivelents of the repeating unit of the polymer per equivalent of the acid group of the merocyanine dye used in the present invention. Of course, the amount of the basic mordant polymer is not limited to the above-described range.

The emulsion layers and other hydrophilic colloid layers of the light-sensitive element can contain other known water soluble dyes in an amount which does not substantially injure the effect of the present invention together with the water soluble dyes according to the present invention. It is particularly advantageous to use two or more dyes as a combination when a desired spectral absorption characteristic cannot be obtained by using one dye. Examples of other dyes which can be used include the oxonol dyes described in Japanese Patent Applications (OPI) 85130/73 and 5125/74 and U.S. Pat. Nos. 3,247,127, 3,653,905, 2,533,472 and 3,379,533, the hemioxonol dyes described in British Patent 584,609 and U.S. Pat. Nos. 3,687,670 and 3,389,994, the styryl dyes described in U.S. Pat. No. 1,845,404 and the merocyanine dyes described in U.S. Pat. No. 2,493,747. The layers can contain, if necessary, alkali soluble pigments, such as maganese dioxide or bleachable pigments, such as colloidal silver together with the dyes according to the present invention.

The hydrophilic colloid layers of the sensitive elements of the present invention can contain a variety of additives so as to improve the quality of the photographic light-sensitive elements, such as hardening agents, coating aids, lubricating agents, matting agents, emulsion polymer latexes, antistatic agents, ultraviolet ray absorbing agents or anti-oxidants, etc., in addition to the hydrophilic colloids, the dyes and the mordants.

Any of silver bromide, silver iodobromide, silver iodobromochloride, silver bromochloride and silver chloride can be used as the silver halide in the photographic emulsion layers of the photographic sensitive elements of the present invention.

An average grain size of silver halide grains in the photographic emulsions (with the grain size being represented by the diameter where the grains are spherical or nearly spherical and the length of a side where they are cubic, which are shown as an average based on the projection area of the grains) is not limited to a specific range. However, a grain size of 3 $\mu$ or less is preferred. The grain size distribution can be either narrow or broad. The silver halide grains in the photographic emulsions can have a regular crystal form, such as a cubic form or an octahedral form or can have an irregular crystal form, such as spherical form or a plate form. Further, the grains can have a composite crystal form of these forms or can consist of a mixture of grains having various crystal forms.

The silver halide grains can have a structure wherein the interior and the outer layer may comprise phases which differ from each other or may form a homogeneous phase. Further, they can be grains wherein latent images are mainly formed on the surfaces thereof or can be grains wherein the latent images are mainly formed in the interior thereof.

The photographic emulsions used in the present invention can be produced by processes described in P. Grafkides, *Chimie et Physique Photographique*, Paul Montel Co., (1967), G.F. Duffin, *Photographic Emulsion Chemistry*, The Focal Press Co., (1966) and V.L. Zelikman et al., *Making and Coating Photographic Emulsions*, The Focal Press Co., (1964). Namely, the emulsions can be produced by any of an acid process, a neutral process and an ammonia process. Further, a single jet process, a double jet process and a combination of these processes can be used for reacting soluble silver salts with soluble halide salts.

A process for forming grains in the presence of excess silver ions (the so-called reversed addition process) can be used as well. As one type of double jet process, it is possible, also, to use a process which comprises holding the pAg of the lqiuid phase for forming silver halide to a definite value, namely, the so-called controlled double jet process.

According to this process, silver halide emulsions having a regular crystal form and a uniform grain size are obtained.

It is also possible to mix two or more silver halide emulsions produced separately.

Cadmium salts, zinc salts, lead salts, thallium salts, iridium salts or the complex salts thereof, rhodium salts or the complex salts thereof, or iron salts or the complex salts thereof can be also present in the formation of the silver halide grains or during the physical ripening of the grains.

Gelatin is advantageously used as a binder or a protective colloid of the photographic emulsions. However, other hydrophilic colloids also can be used. For example, proteins, such as gelatin derivatives, graft polymers of gelatin with other high molecular weight materials, albumin or casein, etc., cellulose derivatives, such as hydroxyethyl cellulose or carboxymethylcellulose, etc., saccharide derivatives, such as agar, sodium alginate or starch derivatives, etc., and hydrophilic synthetic high molecular weight materials, such as partially acetalized polyvinyl alcohol, poly-N-vinylpyrrolidone, polyacrylic acid, polyacrylamide, polyvinylimidazole or polyvinylpyrazole and copolymers thereof can be used.

As the gelatin, not only lime treated gelatin but also acid treated gelatin can be used. Further, gelatin hydrolyzed products and gelatin enzymatic decomposition products can be used as well. Examples of suitable gelatin derivatives include those prepared by reacting a compound such as an acid halide, an acid anhydride, an acid ester, an isocyanate, bromoacetic acid, and alkanesultone, a vinylsulfonamide, a maleinimide compound, a polyalkylene oxide or an epoxy compound, etc., with gelatin. Examples of these are described in U.S. Pat. Nos. 2,614,928, 2,763,639, 3,118,766, 3,132,945, 3,186,846 and 3,312,553, British Patents 861,414, 1,033,189 and 1,005,784 and Japanese Patent Publication 26845/67.

Examples of gelatin graft polymers which can be used are those prepared by grafting homo- or copolymers of vinyl compounds such as acrylic acid, methacrylic acid or derivatives thereof, such as the esters or amides thereof, acrylonitrile or styrene, etc., with gelatin. Particularly, use of gelatin graft polymers prepared by reacting gelatin with polymers having a certain degree of compatibility with gelatin, such as polymers of acrylic acid, methacrylic acid, acrylamide, methacrylamide or hydroxyalkyl methacrylate, etc., is preferred. Examples of these materials are described in U.S. Pat. Nos. 2,763,625, 2,831,767 and 2,956,884.

Useful hydrophilic synthetic high molecular weight materials are those described in, for example, German Patent Application (OLS) 2,312,708 and U.S. Pat. No. 3,879,205.

After formation of the silver halide precipitate or physical ripening, in general, the water soluble salts are removed from the emulsion. This processing can be carried out using the well known water washing method wherein gelatin is gelatinized or can be carried out by a flocculation method wherein inorganic salts containing polyvalent anions such as sodium sulfate, anionic surface active agents, anionic polymers (for example, polystyrene sulfonic acid) or gelatin derivatives (for example, aliphatically acylated gelatin, aromatically acylated gelatin or aromatically carbamoylated gelatin, etc.) are utilized. If desired, removal of the soluble salts can be omitted.

Although silver halide emulsions which are not chemically sensitized, the so-called primitive emulsion, can be used, the emulsions are generally chemically sensitized. Chemical sensitization can be carried out according to methods described in Grafkides, supra, or Zelikman, supra or in H. Frieser, *Die Grundlagen der Photographischen Prozesse mit Silberhalogeniden*, Akademische Verlagsgesellschaft, (1968).

More specifically, a sulfur sensitization process which comprises using sulfur containing compounds or active gelatins which are reactive with silver ions, a reduction sensitization process which comprises using reducing materials or a noble metal sensitization process which comprises using gold or other noble metals can be used. These methods can be used individually or in combination. As sulfur sensitizing agents, it is possible to use thiosulfates, thioureas, thiazoles, rhodanines and other compounds, examples of which are described in U.S. Pat. Nos. 1,574,944, 2,410,689, 2,278,947, 2,728,668 and 3,656,955. As reduction sensitizing agents, it is possible to use stannous salts, amines, hydrazine derivatives, formamidine sulfinic acid or silane compounds, etc., examples of which are described in U.S. Pat. Nos. 2,487,850, 2,419,974, 2,518,698, 2,983,609, 2,983,610 and 2,694,637. In order to carry out noble metal sensitization, it is possible to use not only gold complex salts but also complex salts of metals of Group VIII of the Periodic Table, such as platinum, iridium or palladium, etc., examples of which are described in U.S. Pat. Nos. 2,399,083 and 2,448,060 and British Patent 618,061.

The photographic emulsions used in the present invention can be spectrally sensitized with methine dyes or other dyes. Examples of dyes which can be used for spectral sensitization include cyanine dyes, merocyanine dyes, complex cyanine dyes, complex merocyanine dyes, holopolar cyanine dyes, hemicyanine dyes, styryl dyes and hemioxonol dyes. Particularly preferred dyes are cyanine dyes, merocyanine dyes and complex merocyanine dyes. These dyes can have basic heterocyclic nuclei which are utilized conventionally in cyanine dyes. Examples include nuclei, such as a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus and a pyridine nucleus, etc., nuclei in which an alicyclic hydrocarbon ring is fused to the above-described nucleus, and nuclei in which an aromatic hydrocarbon ring is fused to the above-described nuclei, such as an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus or a quinoline nucleus, etc. These nuclei can have substituents on the carbon atoms thereof.

The merocyanine dyes or the complex merocyanine dyes can have 5- or 6-membered heterocyclic nuclei as nuclei having a ketomethylene structure, such as a pyrazoline-5-one nucleus, a thiohydantoin nucleus, a 2-thioxazolidine-2,4-dione nucleus, a thiazolidine-2,4-dione nucleus, a rhodanine nucleus or a thiobarbituric acid nucleus, etc.

Useful sensitizing dyes are those described in German Patent 929,080, U.S. Pat. Nos. 2,231,658, 2,493,748, 2,503,776, 2,519,001, 2,912,329, 3,656,959, 3,672,897 and 3,694,217, British Patent 1,242,588 and Japanese Patent Publication 14030/69.

These sensitizing dyes can be used alone or as a combination of two or more thereof. Combinations of sensitizing dyes are often used for the purpose of supersensitization. Examples of such combinations are described in U.S. Pat. Nos. 2,688,545, 2,977,229, 3,397,060, 3,522,052, 3,527,641, 3,617,293, 3,628,964, 3,666,480, 3,679,428, 3,703,377, 3,769,301, 3,814,609 and 3,837,862, British Patent 1,344,281 and Japanese Patent Publication 4936/68.

The emulsions can contain dyes which do not have a spectral sensitization function themselves or materials which do not substantially absorb visible rays but exhibit a super-sensitization function together with the sensitizing dyes.

In the light-sensitive elements of the present invention, the photographic emulsion layers can contain various kinds of compounds in order to prevent the occurrence of fog or to stabilize the photographic properties at production, during storage or during the photographic processing of the light-sensitive elements. More specifically, it is possible to add compounds known as anti-fogging agents or stabilizing agents, such as azoles, for example, benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles or mercaptotetrazoles, etc.; mercaptopyrimidines; mercaptotriazines; thioketo compounds, such as oxazolinethione; azaindenes, for example, triazaindenes, tetrazaindenes and particularly 4-hydroxy-(1,3,3a, 7)-tetrazaindenes or pentazaindenes, etc.; benzenethiosulfonic acid, benzenesulfinic acid or benzenesulfonamide, etc.

In the light-sensitive elements of the present invention, the photographic emulsion layers can contain nondiffusible dye image forming couplers which are conventionally used. The dye image forming coupler is a compound which forms a dye by reacting with the oxidation product of an aromatic primary amine developing agent in photographic development (hereinafter, the dye image forming coupler is merely called a coupler). The couplers can be 4-equivalent or 2-equivalent couplers and can be colored couplers for color correction or couplers which release development inhibiting agents (DIR couplers). As yellow forming couplers, open chain type ketomethylene compounds, such as acylaminoacetamide type compounds are useful. As magenta forming couplers, pyrazolone or cyanoacetyl type compounds are useful. As cyan forming couplers, naphthol or phenol type compounds are useful. The couplers can be incorporated into the photographic emulsion layers using methods conventionally employed for multi-color photographic elements. For example, it is possible to use a method which comprises dispersing the couplers in a hydrophilic colloid together with organic solvents having a high boiling point, such as aliphatic esters, aromatic carboxylic acid alkyl esters, aromatic phosphoric acid esters or aromatic ethers, etc., or a method which comprises adding the couplers as an aqueous alkaline solution to the hydrophilic colloid.

The photographic emulsion layers and other layers in the photographic light-sensitive elements of the present invention are formed by coating on flexible supports conventionally used for photographic light-sensitive elements, such as plastic films, paper or cloth or on rigid supports, such as glass, ceramics or metal, etc. Examples of preferred flexible supports include films composed of synthetic or semi-synthetic high molecular weight materials, such as cellulose nitrate, cellulose acetate, cellulose acetate butyrate, polystyrene, polyvinyl chloride, polyethylene terephthalate or polycarbonate, etc., and coated or laminated paper prepared by coating or laminating baryta or $\alpha$-olefin polymers (for example, polyethylene, polypropylene or an ethylenebutene copolymer) on paper. The supports can be colored using dyes or pigments. The supports can be opaque in order to intercept light from side opposite incident light of exposure. The surfaces of these supports are generally processed so as to form a subbing layer in order to improve the adhesion to photographic emulsion layers. The surfaces of the supports can be subjected to a corona discharge, an ultraviolet ray exposure or a flame treatment prior to or after application of a subbing layer.

In the photographic light-sensitive elements of the present invention, the photographic emulsion layers and other hydrophilic colloid layers can be formed by coating on the support or on another layer using known coating methods. The coating can be carried out using a dip coating method, a roll coating method, a curtain coating method or an extrusion coating method, etc. Methods described in U.S. Pat. Nos. 2,681,294, 2,761,791 and 3,526,528 are advantageous methods. A suitable coating thickness for the hydrophilic colloid layer is a thickness from about 1 $\mu$ to about 20 $\mu$. A suitable silver coating amount ranges from about 0.5 to about 200 g/m$^2$.

The present invention can be applied to multilayer color photographic elements in which at least two layers are sensitive to different spectral ranges, too. Multilayer color photographic elements have generally at least one red-sensitive silvier halide emulsion layer, at least one green-sensitive silver halide emulsion layer and at least one blue-sensitive silver halide emulsion layer on the support. These layers may be positioned in a suitable order. In general, the red-sensitive silver halide emulsion layer contains a cyan forming coupler, the green-sensitive silver halide emulsion layer contains a magenta forming coupler and the blue-sensitive silver halide emulsion layer contains a yellow forming coupler. However, other combinations different from the above-described combinations can be employed, if necessary.

According to the present invention, where a dyed hydrophilic colloid layer is provided as a filter layer or an antihalation layer or for another purpose, the photosensitive element has a sufficient absorption density even if the thickness of the dyed layer is reduced to maintain good resolving power. This is because the dyes used in the present invention have high water solubility and good compatibility with gelatin. The light-sensitive elements of the present invention and, particularly, the dyed layers are easily and irreversibly decolored by photographic processings and residual color does not remain after processings. Further, photographic processing solutions are not contaminated by coloring.

In the light-sensitive elements of the present invention, introduction of the dyes into the hydrophilic colloid layers does not adversely influence the photographic properties of the photographic emulsion layers. Namely, the photographic emulsion layers are not desensitized or softened except as a result of the influence of the filter effect of the dyed layer itself (in the case that the dyed layer is positioned nearer incident light than the emulsion layer is). Further, they do not cause the occurrence of fog. The photographic properties, either in the wavelength range to which the silver halide is inherently sensitive or in the wavelength range in which the silver halide is spectrally sensitized, are not influenced in the presence of dye except for the filter effect, even after storage of the light-sensitive elements for a long period of time.

In the light-sensitive elements of the present invention, only the basic polymer containing layers are dyed by the dyes and the dyes do not diffuse into another layer. Therefore, there is neither an undesirable decrease of sensitivity nor an undersirable degradation of gradation of the photographic emulsion layers due to the undesirable spectral absorption effect generally caused by diffusion of the dyes and, consequently, the light-sensitive elements have excellent photographic characteristics and particularly excellent spectral characteristics. This fact is very advantageous in black-and-white or color photographic sensitive elements provided with an antihalation layer between the photographic emulsion layer and the support or color photographic sensitive elements having at least three photographic emulsion layers provided with a filter layer which functions as an antihalation layer between the photographic emulsion layers.

More specifically, if the dyes diffuse from the layer dyed into an emulsion layer positioned above that layer (farther from the support) or to a hydrophilic colloid layer positioned above the emulsion layer, the emulsion layer is subjected to a filter effect by the dyes resulting in a decrease in the sensitivity to light absorbed by the dyes and a softening of the gradation.

However, in the light-sensitive elements of the present invention, since the dyes do not diffuse, any decrease of the sensitivity of the emulsion layers positioned above the dyed layer (farther from the support) can be substantially disregarded. Specifically, the decrease does not exceed about 0.06 in logarithmic exposure amount.

The present invention is now illustrated by reference to the following examples.

EXAMPLE 1

A solution containing gelatin having the following composition was prepared.

| | |
|---|---|
| Gelatin | 40 g |
| Water | 600 cc |
| Poly-(diethylaminothylmethacrylate) Hydrochloride (5% aqueous solution) | 60 cc |
| Dye (1% aqueous solution) | 100 cc |
| 2,4-Dichloro-6-hydroxy-1,3,5-triazine | 200 cc |
| Phenoxypolyoxyethylenebutane Sulfonic Acid (1% aqueous solution) | 40 cc |

As the dye, the above described Dyes (1), (2), (3), (4), (5), (6), (8), (12), (15) and (16) and the following Comparison Dyes A, B, C and D were used, respectively.

Comparison Dye A

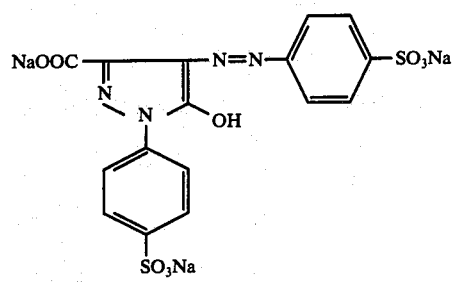

Comparison Dye B

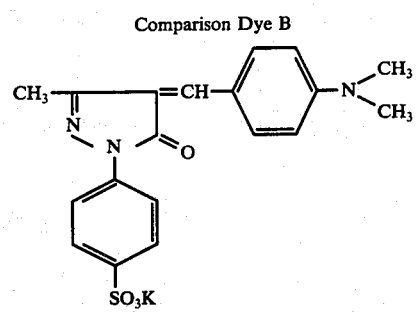

Comparison Dye C

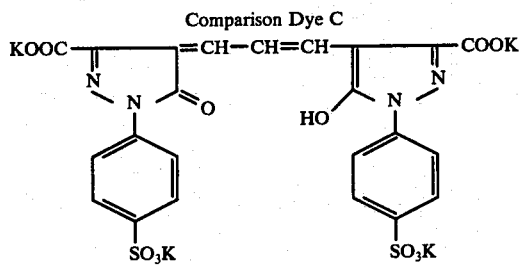

Comparison Dye D

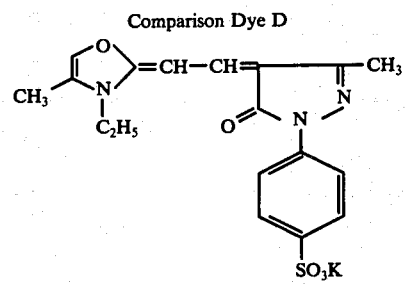

Each solution prepared was applied to a cellulose acetate film in a 4 μ thickness after drying. After the sample was dried, the spectral absorption was measured.

Further, a solution having the following composition was applied to the resulting layer in the above sample in a 8 μ thickness after drying. The sample was then dried for about 20 minutes to conclude drying.

Phthalated Gelatin: 40 g
Water: 980 cc
Sodium Dodecylbenzene Sulfonate (1% aqueous solution): 50 cc This sample was dipped in water at 50° C for 5 minutes while moving it in water to remove the second layer layer which did not contain the dye. It was then dried for 10 minutes. Spectral absorption of the resulting sample was measured.

The optical density at the absorption maximum wavelength measured after application of the first layer is shown as $a_1$ and that measured after applying and removing thw second layer is shown as $a_2$. The dye fixing ratio in the first layer is shown as $P = (a_2/a_1) \times 100$.

The P values obtained in samples using each dye are shown in Table 1 below.

Table 1

| Dye | P Value |
| --- | --- |
| 1 | 83 |
| 2 | 80 |
| 3 | 85 |
| 4 | 83 |
| 5 | 80 |
| 6 | 80 |
| 8 | 81 |
| 12 | 80 |
| 15 | 80 |
| 16 | 81 |
| A (Comparison) | 60 |
| B (Comparison) | 25 |
| C (Comparison) | 55 |
| D (Comparison) | 62 |

In the comparison samples using the known Comparison Dyes A – D, the dyes diffused into the second layer were removed together with the second layer. Therefore, the dye fixing ratio of the first layer was low with these Comparison Dyes. In the samples according to the present invention, most of the dye (about 80%) remained in the first layer without diffusing into the second layer.

EXAMPLE 2

Samples which were prepared by applying the first layer containing the dye in Example 1 were processed at 20° C for 2 minutes using a solution having the following composition, washed with water for 10 seconds and dried.

N-Methyl-p-aminophenol Sulfate: 2 g
Sodium Sulfite: 100 g
Hydroquinone: 5 g
Borax: 2 g
Water to make: 1,000 cc In the Comparison Sample using Dye A, a yellow color remained to a degree of about a half of the initial density. The other samples were colorless and transparent.

EXAMPLE 3

To a cellulose acetate film having a subbing layer, a silver iodobromide (silver iodide content: 6% by mol) emulsion which was color-sensitized to red light using anhydro-5, 5′-dichloro-9-ethyl-3,3′-di-(3-sulfopropyl)-thiacarbocyanine hydroxide and which contained 2,4-dichloro-3-methyl-6-[(2, 4-di-tert-amylphenoxy)acetamido]phenol (cyan forming coupler) was applied in a 5 μ thickness (dry). To the resulting layer, a gelatin intermediate layer was applied in a 1.5 μ thickness (dry) and then a silver iodobromide (silver content 6% by mol) which was color-sensitized to green light using anhydro-9-ethyl-5, 5′-diphenyl-3,3′-di-(3-sulfopropyl)oxacarbocyanine hydroxide (green-sensitive sensitizing dye) and which contained 1-(2,4, 6-trichlorophenyl)-3-{3-[(2,4-di-tert-amylphenoxy)acetamido]benzamido}-pyrazoline-5-one (magenta forming coupler) was applied in a 4 μ thickness (dry). The resulting film was cut into 6 equal pieces. To each of them, one of the coating solutions having the following composition was applied so as to form a yellow filter layer having a 2 μ thickness (dry) (the absorption density at the absorption maximum wavelength of the yellow filter layer was 0.9). Further, to the resulting layer, a blue-sensitive silver iodobromide (silver iodide content: 6% by mol) emulsion containing α-(4-methoxybenzoyl)-2-chloro-5-[α-(2,4-di-tert-amylphenoxy)-butyramido]acetanilide (yellow forming coupler) was applied in a 5μ thickness (dry). Finally, a surface protective layer of gelatin was applied in a 1 μ thickness (dry). These samples were designated Samples 3A - 3F corresponding to each yellow filter layer.

| Coating Solutions for the Yellow Filter Layer | |
| --- | --- |
| 3A: | |
| Aqueous Solution of Gelatin (8% by weight) | 500 cc |
| Poly-(2-diethylaminoethylmethacrylate) Hydrochloride (5% by weight aq. soln.) | 60 cc |
| Comparison Dye A as described in Example 1 (1% by weight aq. slon.) | 120 cc |
| Na Salt of 2,4-Dichloro-6-hydroxy-1,3,5-triazine (1% by wt. aq. soln.) | 25 cc |
| Dodecaethyleneglycol-4-nonylphenol Ether (2% by wt. aq. soln.) | 30 cc |
| 3B: | |
| In 3A, Comparison Dye D was used instead of Comparison Dye A as described in Example 1. The amount of the solution (1% by weight aqueous solution) was 100 cc. | |
| 3C: | |
| In 3A, Dye (1) of the present invention was used instead of Comparison Dye A as described in Example 1. The amount of the solution (1% by weight aqueous solution) added was 50 cc. | |
| 3D: | |
| In 3A, Dye (2) of the present invention was used instead of Comparison Dye A as described in Example 1. The amount of the solution (1% by weight aqueous solution) added was 50 cc. | |
| 3E: | |
| In 3A, Dye (3) of the present invention was used instead of Comparison Dye A as described in Example 1. The amount of the solution (1% by weight aqueous solution) added was 50 cc. | |
| 3F: | |
| Aqueous Solution of Gelatin (containing 8 g of Carey-Lea type yellow colloidal silver) (6% by wt. aq. soln.) | 500 g |
| Na Salt of 2,4-Dichloro-6-hydroxy-1,3,5-triazine (1% by wt. aq. soln.) | 25 cc |
| Polyethyleneglycol-4-nonylphenol Ether (2% by wt. aq. soln.) | 30 cc |

Each sample was exposed to light for 1/200 second through a blue filter (Fuji Color Separation Filter SP-1, produced by Fuji Photo Film Co., Ltd.) and a continuous gray wedge using a tungsten light source of a color temperature of 5500° K, and then processed as follows.

| Step | Temperature | Time |
| --- | --- | --- |
| 1. Color Development | 37.8° C | 3½ minutes |
| 2. Water Wash | " | 1 minute |
| 3. Bleach | " | 4½ minutes |
| 4. Water Wash | " | 1 minute |
| 5. Fixing | | 6 minutes |
| 6. Water Wash | " | 1 minute |
| 7. Stabilizing | " | 1 minute |

Each processing solution used had the following composition.

| Color Developing Solution | | |
| --- | --- | --- |
| Sodium Hydroxide | 2 | g |
| Sodium Sulfite | 2 | g |
| Potassium Bromide | 0.4 | g |
| Sodium Chloride | 1 | g |
| Borax | 4 | g |
| Hydroxylamine Sulfate | 2 | g |
| Tetrasodium Ethylenediaminetetraacetate | 2 | g |
| 4-Amino-3-methyl-N-ethyl-N-(β-hydroxyethyl)aniline Sesquisulfate (monohydrate) | 4 | g |
| Water to make | 1 | l |
| Bleaching Solution | | |
| Sodium (ethylenediaminetetraacetato)-ferric Complex | 100 | g |
| Potassium Bromide | 50 | g |
| Ammonium Nitrate | 50 | g |
| Borax | 5 | g |
| Water to make | 1 | l |

| -continued | | |
| --- | --- | --- |
| Fixing Solution | | |
| Sodium Thiosulfate | 150 | g |
| Sodium Sulfite | 15 | g |
| Borax | 12 | g |
| Acetic Acid (glacial) | 15 | ml |
| Potassium Alum | 20 | g |
| Water to make | 1 | l |
| Stabilizing Solution | | |
| Boric Acid | 5 | g |
| Sodium Citrate | 5 | g |
| Sodium Metaborate (tetrahydrate) | 3 | g |
| Potassium Alum | 15 | g |
| Water to make | 1 | l |

A photographic characteristic curve was drawn for the yellow image on each processed sample, from which the exposure amount necessary to obtain a density of 0.1 above fog was obtained. The sensitivity is shown as the reciprocal of the exposure amount. The relative value of the sensitivity and presence of stains in each sample were as follows.

| Sample No. | Relative Sensitivity to Blue Light Exposure for Yellow Image | Staining |
| --- | --- | --- |
| 3A | 72 | None |
| 3B | 80 | None |
| 3C | 90 | None |
| 3D | 96 | None |
| 3E | 90 | None |
| 3F | 100 (standard) | Present |

In Sample 3A using Comparison Dye A, the sensitivity of the blue-sensitive emulsion layer was decreased considerably as compared with Control Sample 3F because of the filter effect due to diffusion of the dye from the yellow filter layer into the blue-sensitive emulsion layer. In Samples 3C, 3D and 3E of the present invention, the sensitivity was nearly the same as that of Control Sample 3F wherein colloidal silver was used as the yellow filter layer, and stains formed in Sample 3F were not observed.

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive element comprising a support, at least one silver halide light-sensitive emulsion layer and at least one hydrophilic colloid layer, wherein said hydrophilic colloid layer comprises at least one merocyanine dye having an isoxazole nucleus, a pyrazoline-5-one nucleus and at least one acid group in the dye molecule, the 3-position of the isoxazole nucleus being linked through a methine chain to the 4-position of the pyrazoline-5-one nucleus, and a basic polymer having tertiary- or quaternary-nitrogen containing basic residues on the main chain or on the side chains thereof.

2. The light-sensitive element of claim 1, wherein said merocyanine dye is represented by the following general formula (I):

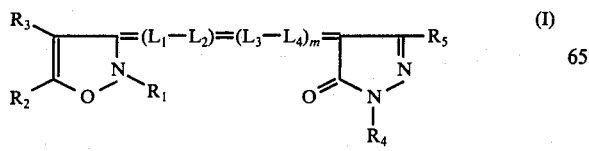

wherein $R_1$ represents an aliphatic hydrocarbon group;
$R_2$ and $R_3$ each represents a hydrogen atom, an alkyl group or a phenyl group;
$R_4$ represents an alkyl group or an aryl group;
$R_5$ represents an alkyl group, a hydroxy group, an alkoxy group, an amino group, an alkoxycarbonyl group, a carbamoyl group, an aryloxycarbonyl group or an aryl group,
with at least one of $R_1$, $R_4$ and $R_5$ containing a sulfo group or a carboxy group as a substituent;
$L_1$, $L_2$, $L_3$ and $L_4$ each represents a methine group or a methine group substituted with an alkyl group or a phenyl group; and
$m$ represents 0 or 1.

3. The light-sensitive element of Claim 1, wherein said merocyanine dye is represented by the following general formula (I):

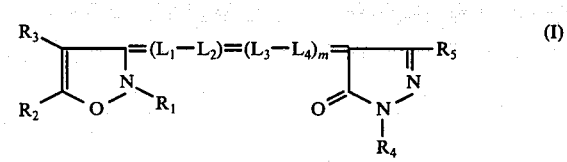

wherein $R_1$ represents an aliphatic hydrocarbon group;
$R_2$ and $R_3$ each represents a hydrocarbon atom, an alkyl group or a phenyl group;
$R_4$ represents an alkyl group or an aryl group;
$R_5$ represents an alkyl group, a hydroxy group, an alkoxy group, an amino group, an alkyl-substituted amino group, an aryl-substituted amino group, an aralkyl-substituted amino group, a ureido group, an alkylureido group, an arylureido group, a cyclic amino group, a carbamoyl group, an alkylcarbamoyl group, an arylcarbamoyl group, an alkoxycarbonyl group, an aryloxycarbonyl group, or an aryl group,
with at least one of $R_1$, $R_4$ and $R_5$ containing a sulfo group or a carboxy group as a substituent;
$L_1$, $L_2$, $L_3$ and $L_4$ each represents a methine group or a methine group substituted with an alkyl group having 1 to 4 carbon atoms or a phenyl group; and
$m$ represents 0 or 1.

4. The light-sensitive element of claim 1, wherein said merocyanine dye is represented by the following general formula (I):

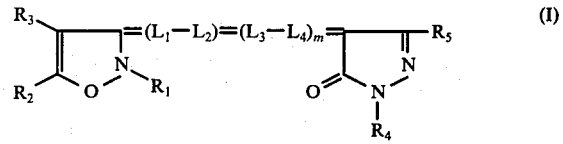

wherein $R_1$ represents an aliphatic hydrocarbon group having 1 to 20 carbon atoms which may be straight chain, branched chain or a ring;
$R_2$ and $R_3$, which may be the same or different, each represents a hydrogen atom, an alkyl group having 1 to 8 carbon atoms, or a phenyl group, which may be substituted with one or more of an alkyl group having 1 to 4 carbon atoms, an alkoxy group having 1 to 4 carbon atoms, a halogen atom or a sulfo group;
$R_4$ represents an alkyl group having a total of 1 to 18 carbon atoms which may be substituted with one or more of a hydroxy group, a cyano group, a halogen atom, a monocyclic or bicyclic aryl group or an alkenyl group having 2 to 8 carbon atoms, or a monocyclic or bicyclic aryl group which may be substituted with one or more of an alkyl group having 1 to 8 carbon atoms, an alkoxy group having 1 to 4 carbon atoms, a halogen atom, an alkoxycarbonyl group having 2 to 8 carbon atoms or an aralkoxy group which may be monocyclic or bicyclic;

$R_5$ represents an alkyl group having 1 to 18 carbon atoms, a hydroxy group, an alkoxy group having 1 to 8 carbon atoms, an amino group, an alkylamino group, an acylamino group, an arylamino group, an aralkylamino group, a ureido group, an alkylureido group in which the alkyl moiety has 1 to 8 carbon atoms, an arylureido group, a cyclic amino group, an alkoxycarbonyl group having an alkoxy moiety of 1 to 14 carbon atoms, a carbamoyl group, an alkylcarbamoyl group having an alkyl moiety of 1 to 4 carbon atoms, an arylcarbamoyl group in which the aryl moiety may be monocyclic or bicyclic, an aryloxycarbonyl group in which the aryl moiety may be monocyclic or bicyclic, or an aryl group, which may be monocyclic or bicyclic and which may be substituted with one or more of an alkyl group having 1 to 8 carbon atoms, an alkoxy group having 1 to 4 carbon atoms or a halogen atom, with at least one of $R_1$, $R_4$ and $R_5$ containing a sulfo group or a carboxy group as a substitutent;

$L_1$, $L_2$, $L_3$ and $L_4$ each represents a methine group or a methine group substituted with an alkyl group having 1 to 4 carbon atoms or a phenyl group; and $m$ represent 0 or 1.

5. The light-sensitive element of claim 2, wherein said dye of the general formula (I) has the general formula (II):

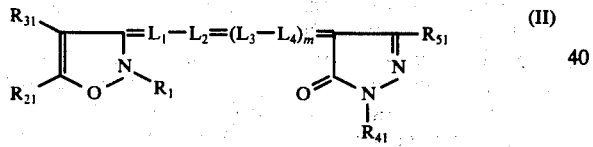

wherein $L_1$, $L_2$, $L_3$, $L_4$ and m each have the same meaning as described in Claim 2;

$R_{21}$ and $R_{31}$, which may be the same or different, each represents a hydrogen atom, a lower alkyl group having 1 to 4 carbon atoms, or a phenyl group;

$R_{41}$ represents a sulfoalkyl group having 1 to 8 carbon atoms, a carboxyalkyl group wherein the alkyl moiety has 1 to 8 carbon atoms, a sulfoaryl group, a carboxyaryl group, a sulfoaralkyl group, or a carboxyaralkyl group;

$R_{51}$ represents an alkyl group having 1 to 8 carbon atoms, a hydroxy group, alkoxy group having 1 to 8 carbon atoms, a carboxy group, an amino group, an alkylamino group having 1 to 8 carbon atoms, an acylamino group having up to 8 carbon atoms, a ureido group, an alkylureido group wherein the alkyl moiety has 1 to 4 carbon atoms, a phenylureido group, an arylamino group, an alkoxycarbonyl group having 2 to 9 carbon atoms, an alkylcarbamoyl group having 2 to 9 carbon atoms, a phenylcarbamoyl group, an aryl group which may be substituted with one or more of an alkyl group having 1 to 4 carbon atoms, an alkoxy group having 1 to 4 carbon atoms or a halogen atom.

6. The light-sensitive element of claim 2, wherein said dye of the general formula (I) has the general formula (III):

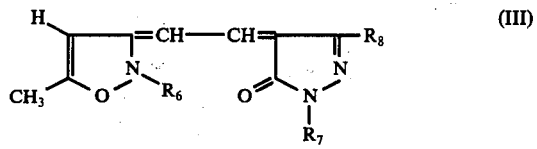

wherein $R_6$ represents a sulfoalkyl group having 1 to 4 carbon atoms or a carboxyalkyl group having 1 to 4 carbon atoms;

$R_7$ represents a sulfoalkyl group having 1 to 4 carbon atoms, a sulfophenyl group, or a carboxyphenyl group; and $R_8$ represents a lower alkyl group having 1 to 4 carbon atoms, a hydroxy group, an alkoxy group having 1 to 4 carbon atoms, an amino group which may be substituted with an alkyl group, an acyl group, a sulfoacyl group, an aryl group, an arylcarbamoyl group, or an alkylcarbamoyl group, an alkylcarbamoyl group having 2 to 5 carbon atoms, a phenylcarbamoyl group, an alkoxycarbonyl group having an alkoxy moiety of 1 to 4 carbon atoms, a carboxy group or a phenyl group.

7. The light-sensitive element of claim 1, wherein said dye has the formula:

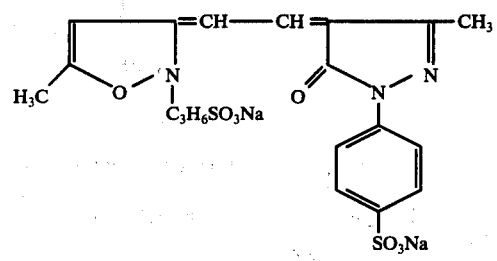

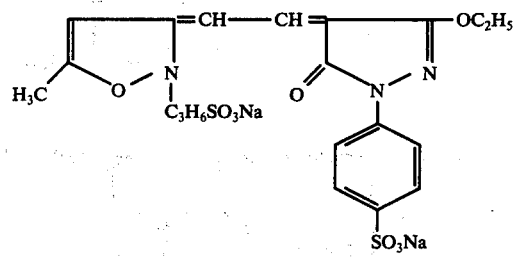

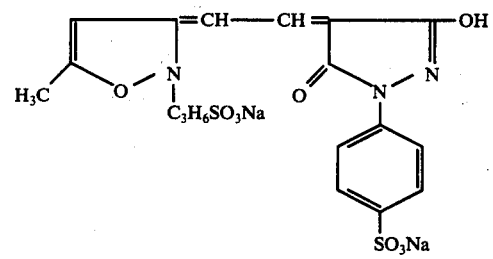

-continued

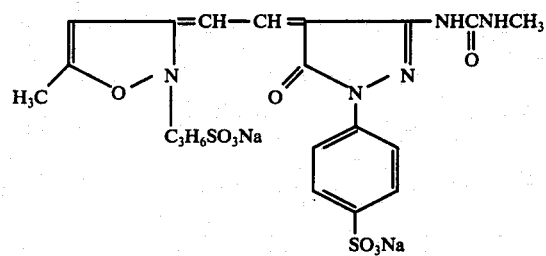

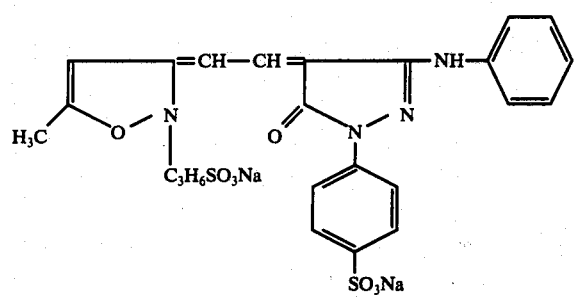

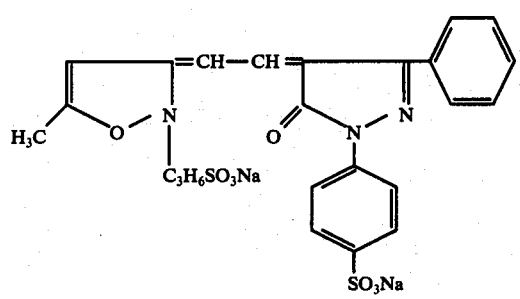

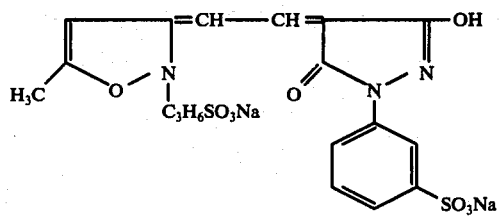

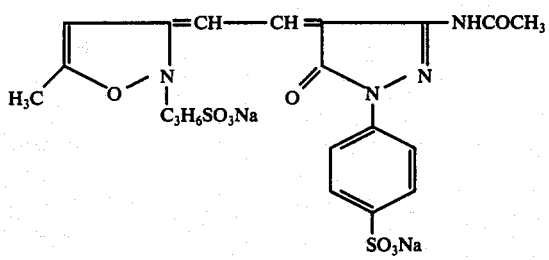

-continued

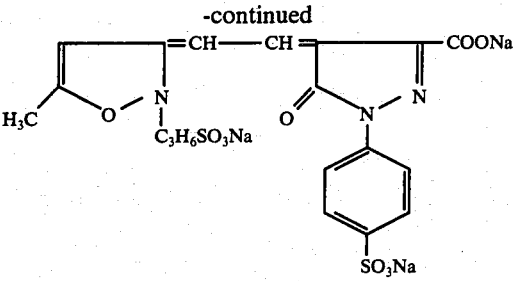

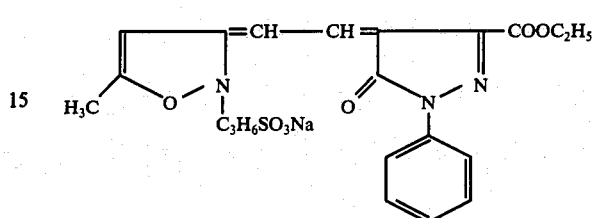

or

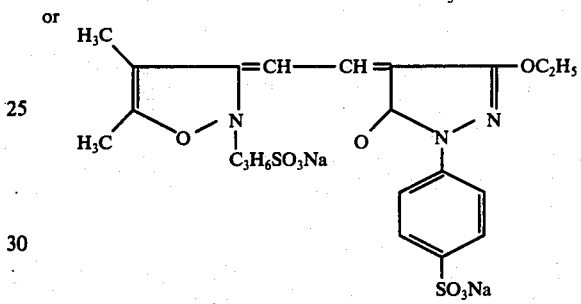

8. The light-sensitive element of claim 1, wherein said merocyanine dye is present in an amount of about 8 to 800 mg of dye per m² of the light-sensitive element.

9. The light-sensitive element of claim 1, wherein said basic polymer has a degree of polymerization of about 1,000 to about 1,000,000.

10. The light-sensitive element of claim 1, wherein said basic polymer is a homopolymer of an ethylenically unsaturated compound having a dialkylaminoalkyl ester residue, a copolymer of an ethylenically unsaturated compound and acrylamide, maleimide polymer, a copolymer of a maleimide and styrene, a polymer of a polyvinyl alkyl ketone or a polyvinyl alkyl aldehyde with aminoguanidine, a polymer containing 2-methylimidazole nuclei in the side chains thereof, an addition polymer of bisacrylamide and a secondary amine and the quaternary salt of said polymer or bisacrylamide and a secondary amine or a copolymer containing therein polyvinyl pyridine or polyvinyl quinoline.

11. The light-sensitive element of claim 1, wherein said basic polymer is present in an amount of about 1 to 5 equivalents of the repeating units of the polymer per equivalent of the acid group of the merocyanine dye.

12. The light-sensitive element of claim 1, wherein said light-sensitive element comprises a blue-sensitive silver halide emulsion layer, a green-sensitive silver halide emulsion layer and a red-sensitive silver halide emulsion layer.

* * * * *